(12) United States Patent
Hugel et al.

(10) Patent No.: US 10,443,755 B2
(45) Date of Patent: Oct. 15, 2019

(54) HYDRAULIC VALVE

(71) Applicant: ECO Holding 1 GmbH, Marktheidenfeld (DE)

(72) Inventors: Christian Hugel, Wendlingen (DE); Johannes Krebs, Ostfildern (DE); Christian Sleziona, Stuttgart (DE)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 15/419,005

(22) Filed: Jan. 30, 2017

(65) Prior Publication Data
US 2017/0261117 A1 Sep. 14, 2017

(30) Foreign Application Priority Data

Mar. 9, 2016 (DE) .................. 10 2016 104 309
Apr. 27, 2016 (DE) .................. 10 2016 107 773

(51) Int. Cl.
*F16K 11/07* (2006.01)
*F16K 31/06* (2006.01)

(52) U.S. Cl.
CPC ...... *F16K 31/0613* (2013.01); *F16K 11/0708* (2013.01); *Y10T 137/8671* (2015.04)

(58) Field of Classification Search
CPC ........ F16K 31/0613; F16K 3/24; F16K 11/07; F16K 11/0708; Y10T 137/8614; Y10T 137/86622; Y10T 137/86694; Y10T 137/8671

USPC ............ 137/625.64, 625.65, 625.25, 625.67, 137/625.69
See application file for complete search history.

(56) References Cited

U.S. PATENT DOCUMENTS

| | | | | |
|---|---|---|---|---|
| 4,220,178 A | * | 9/1980 | Jackson | F16K 11/0708 137/625.3 |
| 4,941,508 A | | 7/1990 | Hennessy et al. | |
| 2006/0011245 A1 | * | 1/2006 | Suzuki | F16K 31/0613 137/625.65 |
| 2011/0067771 A1 | | 3/2011 | Navale | |

(Continued)

FOREIGN PATENT DOCUMENTS

| DE | 19938884 A1 | 2/2001 |
|---|---|---|
| DE | 102014013602 B3 | 10/2015 |

*Primary Examiner* — Kevin F Murphy
*Assistant Examiner* — Kelsey E Cary
(74) *Attorney, Agent, or Firm* — Von Rohrscheidt Patents

(57) ABSTRACT

A hydraulic valve including a valve housing including a longitudinal axis, a receiving opening extending along the longitudinal axis, a first flow through opening of a supply connection, a second flow through opening of an operating connection, a third flow through opening of a tank connection, wherein the first flow through opening, the second flow through opening and the third flow through opening are configured at least partially flowable by a hydraulic fluid flowing through the valve housing, and a valve piston with a control groove which valve piston is axially displaceable in the valve housing in the receiving opening along the longitudinal axis, wherein the flow forces of the hydraulic fluid imparted upon the valve piston are oriented away from a first switching position of the hydraulic valve where the hydraulic fluid flows from the first flow through opening into the second flow through opening.

6 Claims, 4 Drawing Sheets

(56) References Cited

U.S. PATENT DOCUMENTS

| | | | |
|---|---|---|---|
| 2013/0207012 A1* | 8/2013 | Williams | F16K 31/0658 251/129.07 |
| 2014/0352828 A1 | 12/2014 | Landrum | |
| 2015/0013808 A1* | 1/2015 | Yamaguchi | F16K 47/02 137/625.69 |
| 2015/0252908 A1 | 9/2015 | Nagasaki | |

* cited by examiner

HYDRAULIC VALVE

RELATED APPLICATIONS

This application claims priority from and incorporates by reference German Patent Applications DE 10 2016 104 309.5 filed on Mar. 9, 2016, and DE 10 2016 107 773.9 filed on Apr. 27, 2016.

FIELD OF THE INVENTION

The invention relates to a hydraulic valve, in particular a hydraulic transmission valve for a motor vehicle.

BACKGROUND OF THE INVENTION

A hydraulic valve is used to control a pressure in a system, wherein a so called consumer is charged with a hydraulic fluid or the hydraulic fluid is drained from the consumer. In order to charge the consumer an operating connection of the hydraulic valve is put into a flow connection with a supply connection of the hydraulic valve wherein a hydraulic flow is run from the supply connection into the operating connection. When the consumer is to be drained the supply connection is closed and the operating connection is flow connected with a tank connection so that the hydraulic fluid can flow from the operating connection into the tank connection. The hydraulic fluid is conducted to the connections by a valve piston of the hydraulic valve. For this purpose the valve piston has a control groove which is aligned with the flow through openings of the connections as required.

DE 10 2014 013 602 B3 discloses a hydraulic valve, in particular a hydraulic transmission valve. The hydraulic valve includes three hydraulic connections. It is well known that the three connections are designated as a supply connection P, an operating connection A and, tank connection T. The hydraulic valve includes an axially movable valve piston wherein a control groove of the valve piston can be put into a position where it establishes a flow connection between the hydraulic connections.

A consumer can have a large volume which has to be filled within a short time period, a so called filling period. This means in order to keep the filling period small a volume flow of the hydraulic fluid has to be maximized. During filling large, in particular variable flow forces occur which counteract an opening of the flow through opening of the supply connection. These flow forces are a function of volume flow, ravel, temperature and pressure and can increase the filling period greatly. This has to be prevented in particular when the hydraulic valve is used as a transmission valve since so called jerking can occur due to the increased charging time period when the vehicle starts moving.

BRIEF SUMMARY OF THE INVENTION

It is an object of the invention to provide a hydraulic valve, in particular a hydraulic transmission valve which facilitates a reduced charging time due to flow force compensation.

The object is achieved by a hydraulic valve including a valve housing including a longitudinal axis, a receiving opening extending along the longitudinal axis, a first flow through opening of a supply connection, a second flow through opening of an operating connection, a third flow through opening of a tank connection, wherein the first flow through opening, the second flow through opening and the third flow through opening are configured at least partially flowable by a hydraulic fluid flowing through the valve housing, and a valve piston with a control groove which valve piston is axially displaceable in the valve housing in the receiving opening along the longitudinal axis; and a displacement device configured to axially displace the valve piston and axially position the control grove relative to the first pass through opening, the second pass through opening and the third pass through opening, wherein the valve piston is configured so that a hydraulic compensation of flow forces of the hydraulic fluid is provided, and wherein the flow forces of the hydraulic fluid imparted upon the valve piston are oriented away from a first switching position of the hydraulic valve where the hydraulic fluid flows from the first flow through opening into the second flow through opening.

Advantageous embodiments and advantages of the invention can be derived from the dependent claims, the description and the drawing figure.

A hydraulic valve, in particular a hydraulic transmission valve is proposed which is configured to compensate operational flow forces.

The hydraulic valve includes a valve housing with a longitudinal axis and a receiving opening extending along the longitudinal axis. The valve housing includes a first flow through opening of a supply connection, a second flow through opening of an operating connection and a third flow through opening of a tank connection, wherein the flow through openings are configured so that they are at least partially flowable by a hydraulic fluid flowing through the valve housing. A valve piston with a control groove is arranged in the receiving opening so that the valve piston is axially moveable along a longitudinal axis of the valve housing. The hydraulic valve furthermore includes a displacement device for axially displacing the valve piston, wherein the displacement device facilitates axially positioning the control groove relative to the flow through openings. In order to compensate flow forces from the hydraulic fluid which are oriented against a first switching position of the hydraulic valve in which the hydraulic fluid flows from the first flow through opening into the second flow through opening, the valve piston is configured to provide the compensation.

It is an essential advantage of the flow force compensation that a so called charging time of a consumer connected to the operating connection is reduced.

This provides a smooth shifting process of the transmission when the hydraulic valve according to the invention is used in a transmission of a motor vehicle.

The flow forces of the hydraulic fluid generate pressure forces during operation of the hydraulic valve which pressure forces counteract an opening of the first pass through opening and therefore cause a closing flow force. It is an advantage of hydraulic valve according to the invention that flow forces which are generated at the movable valve piston can be influenced directly. Put differently, a geometry of the valve piston can be adapted so that a flow force is generated which is oriented opposite to the closing flow force so that it compensates the closing flow force.

In an embodiment of the hydraulic valve according to the invention the control groove is configured so that the compensation can be achieved. The hydraulic fluid flowing out of the first flow through opening into the second flow through opening is run through the control groove of the valve piston and directly impacts control surfaces of the control groove. Thus, an adapted geometric shape of the control groove helps to obtain flow compensation. The control groove can be used to connect the first flow through opening with the second flow through opening in a flowable manner so that a reduction of a supply pressure dependency of the flow forces is obtained.

A reduction of the flow forces can also achieved using a throttle, however this would also reduce volume flow and thus the charging time. In order to avoid a throttle or a throttling location the control groove includes a first control surface that is oriented towards the first flow through opening and a second control surface that is arranged opposite to the first control surface and a third control surface that connects the first control surface with the second control surface. In order to compensate the flow forces of the hydraulic fluid the first control surface is at least partially inclined with respect to the third control surface or a virtual surface configured parallel to the third control surface and/or configured cambered. In particular the first control surface is inclined and/or configured cambered in its entirety relative to the third control surface or the virtual surface.

Put differently a bevel is configured at a side of the control groove which side is oriented towards the first flow through opening wherein the bevel starts immediately or after a vertical shoulder which provides a delayed reduction of a pressure of the hydraulic fluid in a direction towards the second flow through opening. This pressure reduction generates a pressure force that opens the first flow through opening and compensates a pressure force acting in a direction towards the second flow through opening. Pressure reduction can be implemented through various shapes of the first control surface. The pressure reduction can be achieved for example by plural segments with identical and/or different angles or through cambering.

In an advantageous embodiment for improved flow force compensation in case the first control surface is partially inclined, a first surface section of the first control surface and a second surface section of the second control surface is configured, wherein an angle is configured between the second surface section and the third control surface or the virtual surface which angle is greater than 90° and less than 180° or if the first control surface is configured inclined in its entirety an angle is configured between the first control surface and the third control surface or the virtual surface wherein the angle is greater than 90° and less than 180° and if the first control surface is configured partially cambered a first surface section of the first control surface and a second surface section of the first control surface is configured, wherein the second surface section is configured cambered, in particular configured concave or if the first control surface is configured concave in its entirety the first control surface is configured in particular concave.

In another embodiment of the hydraulic valve according to the invention a deflection element is configured between the first control surface and the second control surface. The deflection element provides a directional flow control of the hydraulic fluid and viscous closing flow forces are reduced. Closing pressure forces at the second control surface are also reduced since the deflection element prevents a fast and direct flowing of the first control surface.

A flow force reducing effect of the deflection element is increased in particular in that a thickness of the deflection element in a direction of the second control surface is configured at least constant or increasing in size. Put differently this means that a wall surface of the deflection element oriented towards the first control surface can also be configured inclined and/or divided into plural segments or a profile with continuous angle change can be configured cambered.

Advantageously a first wall surface of the deflection element that is oriented towards the first control surface is configured inclined, wherein an angle greater than 0° and less than 90° is arranged between the third control surface or the virtual surface first wall surface.

A geometric shape of the valve piston has to be adapted to the application of the hydraulic valve.

In another embodiment of the hydraulic valve according to the invention a greatest distance between the first control surface and a first wall surface of the deflection element oriented towards the first control surface is configured greater than a wall thickness of the valve housing between the first flow through opening and the second flow through opening and smaller than the wall thickness plus an axial diameter of the second flow through opening. This implements a controlled deflection of the hydraulic fluid into the second flow through opening starting from the first flow through opening.

In another embodiment of the hydraulic valve according to the invention a clear distance between a second wall surface of the deflection element arranged opposite to the second control surface and the second control surface starting from a largest diameter of the deflection element in a direction towards the third control surface is configured continuously variable, wherein a free distance in a direction towards the third control surface is configured decreasing. This leads to an additional reduction of closing flow forces of the hydraulic fluid.

In another embodiment of the hydraulic valve according to the invention the deflection element includes a ring that is offset from the first control surface wherein the ring includes a ring surface that is configured parallel to the virtual surface. This leads to an economical hydraulic valve with a long service life since the ring facilitates configuring a tip of the hydraulic element with a blunt shape wherein the tip is oriented towards the second flow through opening.

Advantageously the deflection element is configured as a ring enveloping the control groove in order to achieve economic production of the hydraulic valve, wherein the valve piston is configured as a turned component.

In another advantageous embodiment the hydraulic valve according to the invention includes a linear displacement device including a magnet armature and a spring element wherein the spring element is arranged at a first end of the valve housing that is configured adjacent to the first flow through opening and the magnet armature is arranged at a second end of the valve housing that is configured adjacent to the third flow through opening.

Advantageously a seal element is arranged in the valve housing which seal element is penetrated by an end of the valve piston that is configured as a piston plunger. Using the seal element helps to significantly reduce an exchange of contaminant particles between the magnet portion and the hydraulic portion of the hydraulic valve wherein the contaminant particles would otherwise impair the magnetic or hydraulic functions. In particular a negative influence upon armature travel in the pole tube and magnet valve hysteresis caused thereby can be prevented. Overall robustness of the hydraulic valve is increased. Magnetic transversal forces in the portion of the piston plunger are also reduced.

BRIEF DESCRIPTION OF THE DRAWINGS

Additional advantages of the invention can be derived from the following drawing description. The drawings illustrate embodiments of the invention. The drawings, the description and the claims include multiple features in combination. A person skilled in the art will advantageously view the features individually and combine them into useful additional combinations, wherein:

Figure 1:
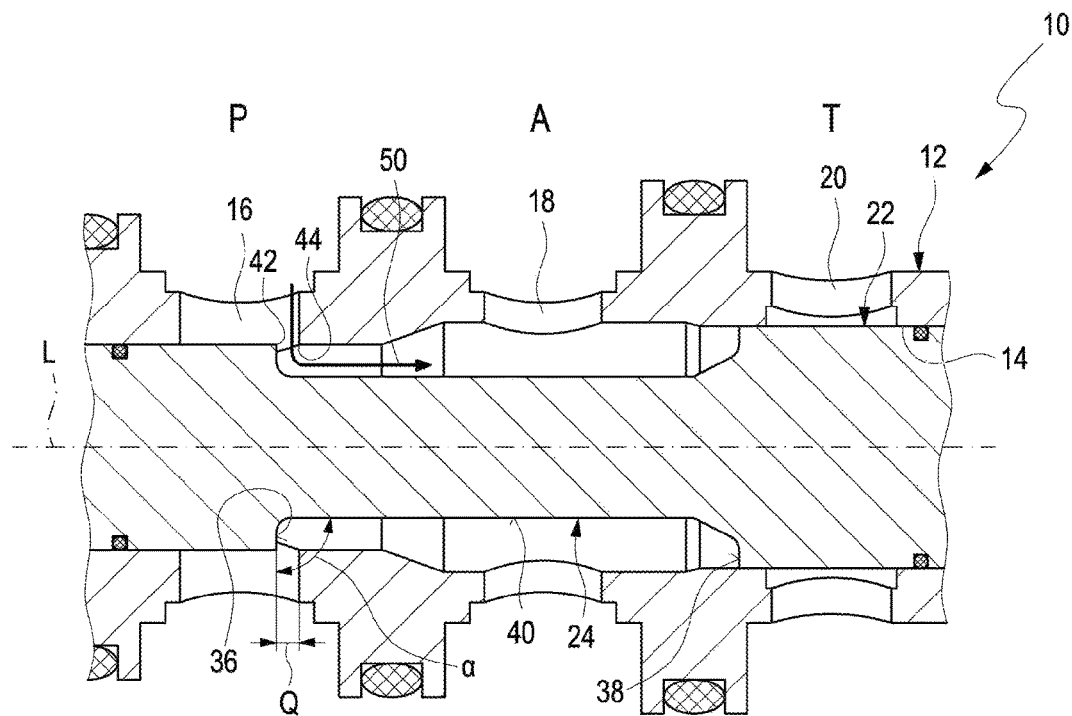
FIG. 1 illustrates a detail of a sectional view of a prior art hydraulic valve in a first switching position.

DETAILED DESCRIPTION OF THE INVENTION in the drawing figures identical or like components are designated with identical reference numerals. The drawing figures merely illustrate embodiments and do not limit the scope and sprit of the invention. For reasons of clarity the components may not be provided with a reference numeral in all figures without losing their association.

A detail of a prior art hydraulic valve is illustrated in FIG. 1 in a sectional view of the hydraulic valve 10. The hydraulic valve 10 which is configured in FIG. 1 as a pressure control valve for a transmission, thus a transmission valve, includes a valve housing 12 with a longitudinal axis L, wherein the valve housing 12 includes a receiving opening 14 extending along the longitudinal axis L.

The valve housing 12 furthermore includes a first flow through opening 16 which is associated with a supply channel P for supplying a hydraulic fluid, a second flow through opening 18 which includes an operating connection A in particular for supplying the hydraulic fluid to a consumer and a third flow through opening 20 which is associated with a tank connection T for draining the hydraulic fluid from the consumer.

A valve piston 22 is arranged in the receiving opening 14 so that the valve piston can be axially positioned along the longitudinal axis L. Put differently the valve piston 22 is axially displaceable in the valve housing 12. The valve housing 12 with the valve piston 22 forms a hydraulic portion of the hydraulic valve 10.

The valve piston 22 includes a control groove 24. The control groove 24 is provided as an annular groove. The control groove 24 facilitates opening or closing the flow through openings 16, 18, 20 so that a flow of the hydraulic fluid is controllable. In order to open or close the flow through openings 16, 18, 20 the valve piston 22 is displaced in the axial direction by a displacement device 26. The displacement device 26 is illustrated FIG. 3 which illustrates a hydraulic valve 10 according to the invention.

The displacement device 26 includes a first displacement portion 28 that is loadable with an electric current and includes a magnet armature 32 that is enveloped by a coil 30 that is loadable with the electrical current and a second displacement portion 34 that is not loadable with an electric current and which is configured as a spring element, in this embodiment configured as a coil spring and which is supported at the valve housing 12. The first displacement portion 28 of the displacement device 26 forms a magnet portion of the hydraulic valve 10.

Figure 3:
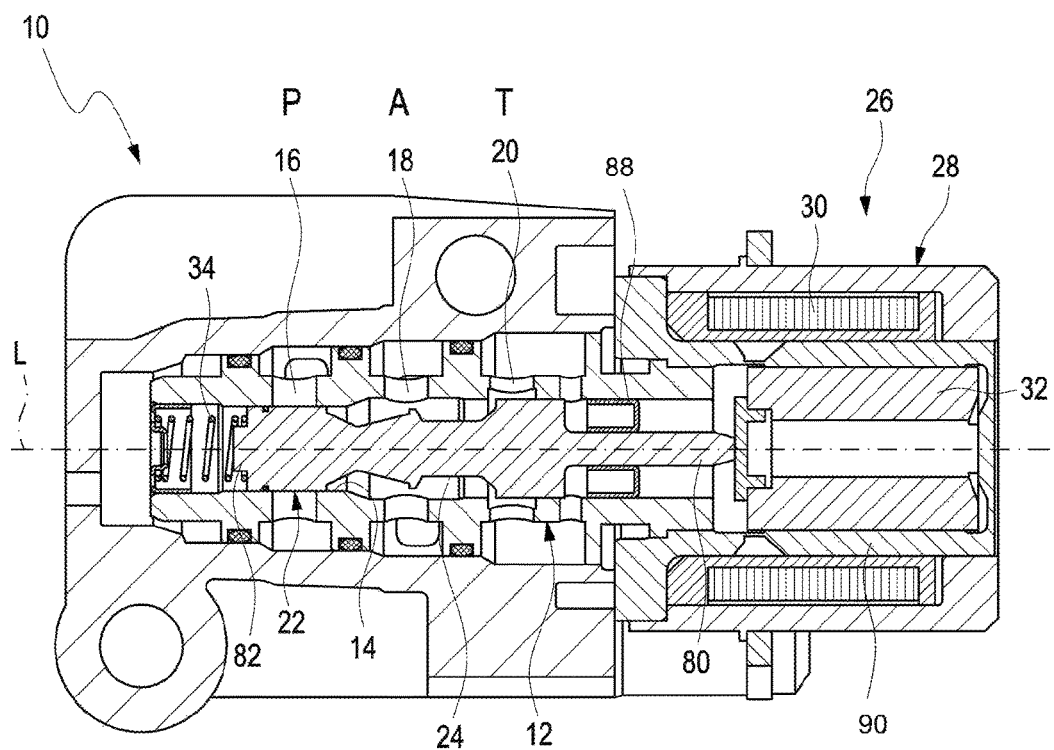
FIG. 3 illustrates a sectional view of a hydraulic valve according to the invention in a second switching position.
Figure 4:
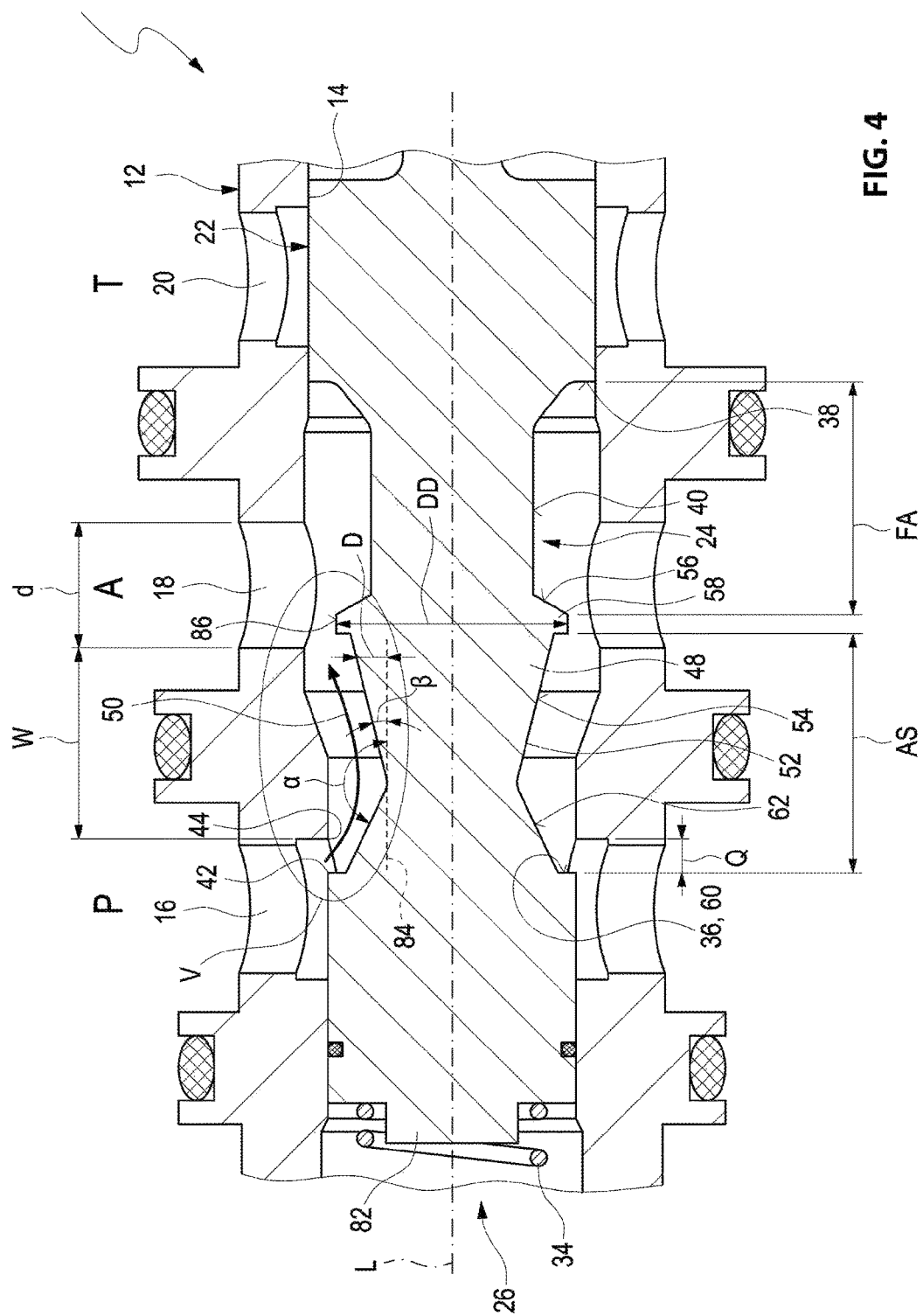
FIG. 4 illustrates a detail of a sectional view of the hydraulic valve according to FIG. 3 in first switching position.
Figure 5:
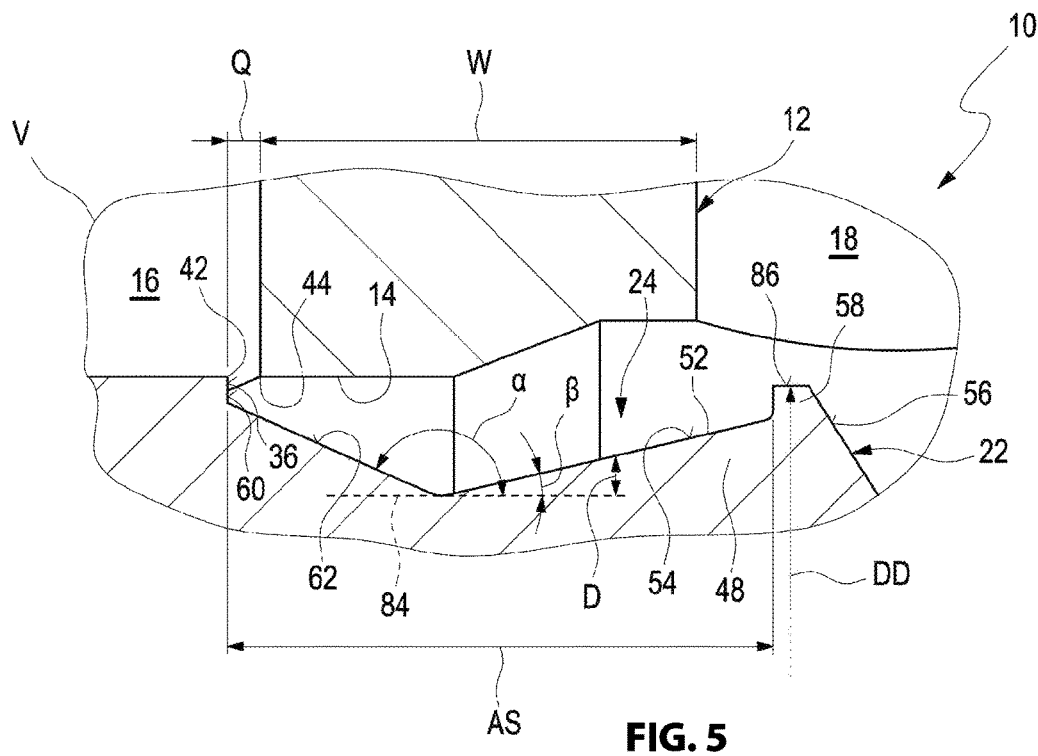
FIG. 5 illustrates a detail V of the hydraulic valve according to the invention in the first switching position.

The displacement device 26 positions the valve piston 22 during operation the hydraulic valve 10 so that the control groove 24 facilitates a flow through of the hydraulic fluid from the first flow through opening 16 into the second flow through opening 18 or starting from the second flow through opening 18 into the third flow through opening 20. If the hydraulic fluid can flow from the first flow through opening 16 into the second flow through opening 18 the hydraulic valve 10 is disposed in a first switching position. The hydraulic valve is in a second switching position when the hydraulic fluid can flow from the second flow through opening 18 into the third flow through opening 20. Put differently in the first switching position the operating connection A is provided with hydraulic fluid, whereas in the second switching position the hydraulic fluid flows from the operating connection A into the tank connection P as illustrated in FIG. 3.

In order to position the valve piston 22 in the first switching position the first displacement portion 28 which is arranged at a first end of the valve piston 22 is supplied with current, so that the magnet armature 32 is moved in a direction towards the spring element 34 due to the magnetic field that is generated wherein the spring element 34 is provided at a second end of the valve piston 22 that is arranged oriented away from the first end. It is apparent that the first end 80 is configured as a piston plunger.

The magnet armature 32 is connected with the valve piston 22 and presses the valve piston 22 in a direction towards the spring element 34. This preloads the spring element 34. As soon as the electrical current application is terminated the valve piston 22 is pressed by the preloaded spring element 34 in a direction of the first displacement portion 28. During operation of the hydraulic valve 10 a force equilibrium at the valve piston 22 that is caused by the first displacement portion 28 and the second displacement portion 34 is intended.

The control groove 24 includes a first control surface 36 oriented towards the first flow through opening 16 and a second control surface 38 configured opposite to the first control surface. The first control surface 36 and the second control surface 38 are connected by a third control surface 40 of the control groove 24. The first control surface 26 of the hydraulic valve 10 that is known in the art is arranged perpendicular to the third control surface 40 wherein a first angle α with 90° is configured between the first control surface 36 and the third control surface 40.

The first control surface 36 includes a first control edge 42 that is arranged opposite to the valve housing 12 and facilitates closing or opening the first flow through opening 16. For opening the first flow through opening 16 the valve piston 22 is moved axially in a direction of the spring element 34 until a flow cross section Q is configured between the first control edge 42 and a second control edge 44 of the first flow through opening 16 wherein the second control edge is oriented towards the second flow through opening 18.

Figure 2:
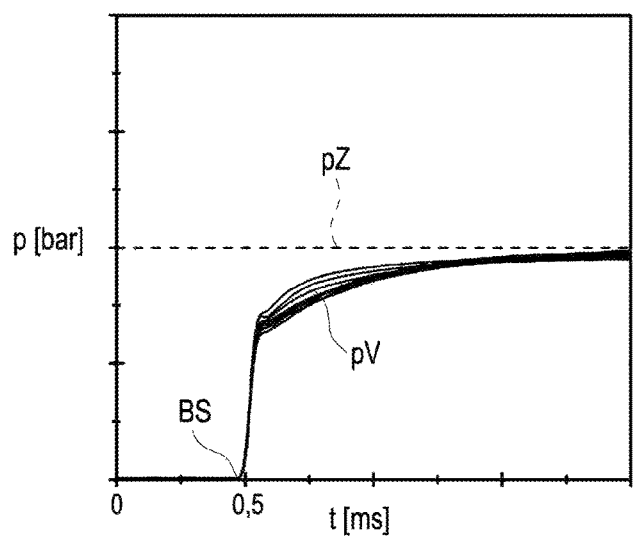
FIG. 2 illustrates a p-t diagram with lines of different supply pressures of the hydraulic valve according to FIG. 1.

In a p-t diagram illustrated in FIG. 2, put differently a diagram that plots pressure over time, lines are plotted that represents a pressure p at different supply pressures pV of the hydraulic valve 10 according to FIG. 1, wherein the pressure p is plotted in the unit [bar] and the time t is plotted in the unit [ms]. The dashed line represents the nominal pressure pZ that is to be achieved in the operating connection A. Thus, it is illustrated in the p-t diagram which time period is required starting from n electrical current starting point BS of the coil 30 to reach this required pressure pZ at different supply pressures pV in the operating connection A.

Reaching 90% of the nominal pressure of 2 bar in the operating connection A is performed for a hydraulic valve 10 configured according to FIG. 1 as a function of a supply pressure pV of 20 bar within 555 ms.

In the known hydraulic valve 10 uncontrolled opening of the third flow through opening 20, this means closing the first flow through opening 16 can occur as a function of a volume flow of the hydraulic fluid from the supply channel P into the operating connection A when a force equilibrium between a first force imparted by the first displacement portion of the displacement device 26 and a second force imparted by the second displacement portion 34 of the displacement device 26 is disturbed by flow forces of the hydraulic fluid. Put differently this means that the flow forces of the hydraulic fluid impart a pressure in particular upon the second control surface 38 wherein the pressure is large enough so that the valve piston 22 is displaced in a direction towards the magnet armature 32. The desired force equilibrium is disturbed. Put differently this means that the flow forces of the hydraulic fluid in a first switching position of the hydraulic valve 10 in which the hydraulic fluid shall flow from the first flow through opening 16 into the second flow through opening 18 are oriented opposite to one another. This means that a force is generated by the flow forces which displaces the valve piston 22 at least towards its position in the second switching position.

In order to compensate the flow forces of the hydraulic fluid the first control surface 36 is partially configured inclined with respect to a virtual surface 84 configured parallel to the third control surface 40. The first control surface 36 includes a first surface section 60 including the first control edge 42 and a second surface section 62 arranged adjacent to the first surface section 60, wherein an angle α with a value of 155" is configured between the second surface section 62 and the virtual surface 84. Put differently the first angle α has a value greater than 90°.

In an embodiment that is not illustrated detail the first control surface 36 is cambered in its entirety, in particular configured concave. A transition portion of the first control surface 36 which is configured adjacent to the third control surface 40 is advantageously configured tangentially approaching the third control surface 40. By the same token the first control surface 36 can be configured only partially cambered, wherein the first surface portion 60 is configured flat and the second surface portion 62 is configured cambered. The first control surface 36 can also be configured incline in its entirety.

In order to further influence the flow forces the control groove 24 includes a deflection element 48. The deflection element 48 is configured as a central bar that is arranged between the first control surface 36 and the second control surface 38 and which envelops the control groove 24 in an annular manner. The deflection element 48 deflects the hydraulic fluid flowing from the first flow through opening 16 over the first control surface 36 into me control groove 24 in a direction towards the second flow through opening 18 according to the arrow 50.

The deflection element 48 includes a flow adapted contour 52 wherein the contour 52 is advantageously configured so that the flow forces of the hydraulic fluid impart axial force components oriented along the longitudinal axis L wherein the axial ford components are less than vertical force components acting perpendicular thereto.

A first wall surface 54 of the deflection element 48 wherein the first wall surface is oriented towards the first control surface 36 is inclined relative to the virtual surface 84 by a second angle β wherein the second angle β has a value of 12.5° in the illustrated embodiment. In the illustrated embodiment the deflection element 48 is cone shaped.

By the same token the deflection element 48 can also have a shaped that differs from a cone. For example the first wall surface 54 can be configured concave. As a matter of principle the deflection element 48 includes a thickness D that increases in a direction towards the second control edge 38.

In order to provide a hydro dynamically effective deflection of the hydraulic fluid wherein the flow forces imparted upon the deflection element 48 and oriented along the longitudinal axis L have a minimum value a distance AS between the first control surface 36 and the first wall surface 54 is greater than a wall thickness W of the valve housing 12 between the first flow through opening 16 and the second flow through opening 18. Additionally the distance AS is sized at the most as a sum of the wall thickness W and a diameter D of the second pass through opening 18. Advantageously the distance AS has a value defined by the equation AS=W+d/2.

In order to provide an advantageous flow of the hydraulic fluid in a second switching position from the operating connection A into the tank connection T a clear distance FA between a second wall surface 54 of the deflection element 48 arranged opposite to the second control surface 38 and the second control surface 38 in a radial direction of the deflection element 48 is configured variable. The clear distance FA decreases starting from a largest diameter DD of the deflection element 48 in a direction towards the third control surface 40.

The deflection element 48 includes a ring 58 that is offset from the first control surface 36 wherein the ring 58 includes a ring surface 86 oriented parallel to the virtual surface 84.

A seal element 88 illustrated in FIG. 3 and configured as a deep drawn disc with a u-shaped cross section is used for a spatial separation of the magnet and hydraulic portion of the hydraulic valve 10 and is advantageously pressed into the valve housing 12, wherein the piston plunger penetrates the seal element 88.

Thus, an exchange of contaminant particles which impair magnetic and/or hydraulic functions can be significantly reduced between the magnet portion and the hydraulic portion of the hydraulic valve 10. In particular a negative influence upon an armature movement in the pole tube 90 and a magnet valve hysteresis caused thereby can be prevented.

The seal element 88 in the valve housing 12 is provided as a gap seal, wherein a ratio of seal length to gap height of the seal gap reduces an exchange of the hydraulic fluid to a minimum.

The seal element 88 reduces an exchange volume between the magnet portion and the hydraulic portion of the hydraulic valve 10 significantly by reducing the piston plunger volume arranged in the magnet portion. This increases overall robustness and service life of the hydraulic valve 10 since only a low amount of contaminants is introduced into the magnet portion. By the same token magnetic transversal forces in the portion of the piston plunger and thus valve hysteresis can be reduced.

Figure 6:
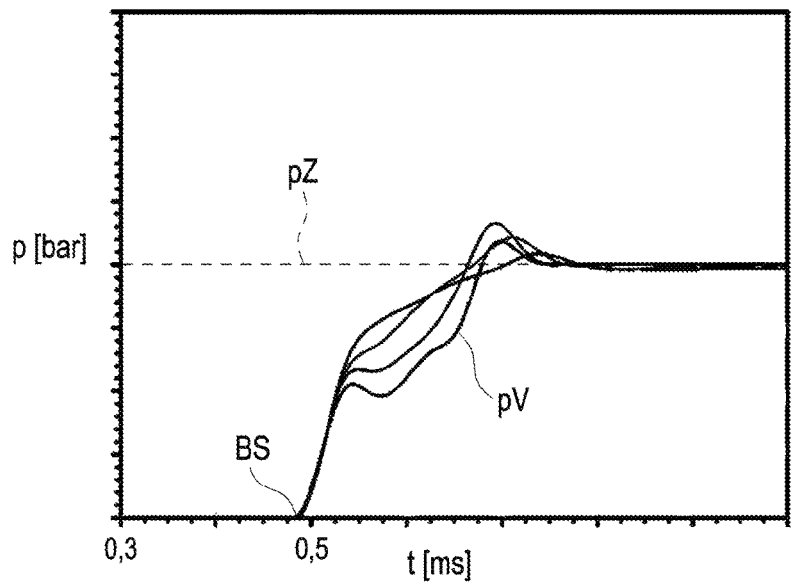
FIG. 6 illustrates a p-t diagram with lines representing different supply pressure of the hydraulic valve according to the invention.

In the p-t diagram illustrated in FIG. 6 lines of pressures supplied at the operating connection A at different supply pressures pV of the hydraulic valve 10 according to the invention according to FIG. 3 are plotted. 90% of the nominal pressure of two bar in the operating connection A is reached in the hydraulic valve 10 according to the invention as a function of a supply pressure p/V of 20 bar within approximately 170 ms, thus in a significantly shorter time period.

REFERENCE NUMERALS AND DESIGNATIONS 10 hydraulic valve
12 valve housing
14 receiving opening
16 first flow through opening
18 second flow through opening
20 third flow through opening
22 valve piston
24 control groove
26 displacement device
28 first displacement portion
30 coil
32 magnet armature
34 second displacement portion
36 first control surface
38 second control surface
40 third control surface
42 first control edge
44 second control edge
48 deflection element
50 arrow
52 contour
54 first wall surface
56 second wall surface
58 ring
60 first surface section
62 second surface section
80 first end
82 second end
84 virtual surface
86 annular surface
88 seal disc
90 pole tube
A operating connection
AS greatest distance
BS start of electrical current loading
D thickness
DD largest diameter
FA clear distance
L longitudinal axis
P supply connection
Q cross section
T tank connection
W wall thickness
d diameter
p pressure
pV supply pressure
pZ nominal pressure
t time
α first angle
β second angle

What is claimed is:
1. A hydraulic valve, comprising:
a valve housing including
a longitudinal axis,
a receiving opening extending along the longitudinal axis,
a first flow through opening of a supply connection,
a second flow through opening of an operating connection,
a third flow through opening of a tank connection,
a valve piston with a control groove which valve piston is axially displaceable in the valve housing in the receiving opening along the longitudinal axis; and
a displacement device configured to axially displace the valve piston and axially position the control groove relative to the first pass through opening, the second pass through opening and the third pass through opening,
wherein the first flow through opening, the second flow through opening and the third flow through opening are configured at least partially flowable by a hydraulic fluid flowing through the valve housing,
wherein the hydraulic fluid flows from the first flow through opening into the second flow through opening in a first switching position of the hydraulic valve,
wherein flow forces are imparted by the hydraulic fluid upon the valve piston in the first switching position in a direction along the longitudinal axis and away from the first switching position,
wherein the valve piston is configured to provide a compensation of the flow forces that are imparted by the hydraulic fluid upon the valve piston in the first switching position in the direction along the longitudinal axis and away from the first switching position,
wherein the compensation is provided in a direction along the longitudinal axis and towards the first switching position,
wherein the control groove is configured to provide the compensation,
wherein the control groove includes a first control surface that is arranged towards the first flow through opening, a second control surface that is arranged opposite to the first control surface, and a third control surface that connects the first control surface with the second control surface,
wherein the first control surface is at least partially inclined or cambered relative to the third control surface or relative to a plane that is configured parallel to the third control surface and the longitudinal axis,
wherein the first control surface is inclined or cambered in its entirety relative to the third control surface or the plane,
wherein a deflection element is formed between the first control surface and the second control surface,
wherein the deflection element is formed between the first control surface and the third control surface,
wherein a first wall surface of the deflection element that is oriented towards the first control surface is configured inclined at a second angle,
wherein the second angle is enclosed between the third control surface or the plane and the first wall surface of the deflection element,
wherein the second angle is greater than 0° and less than 90°,
wherein the deflection element includes a circumferential protrusion that is offset from the first control surface,
wherein the circumferential protrusion extends beyond a cone that is defined by the first wall surface of the deflection element,
wherein the circumferential protrusion includes a circumferential surface that is oriented parallel to the plane,
wherein a diameter of the circumferential surface is greater than a diameter of the third control surface,
wherein a second surface section of the first control surface and the first wall surface inclined at the second angle of the deflection element are adjacent to each other, and wherein
the first control surface is configured partially inclined and a first surface section of the first control surface and the second surface section of the first control surface is provided and a first angle which is greater than 90° and less than 180° is provided between the second surface section of the first control surface and the third control surface or the plane, or the first control surface is inclined in its entirety and a first angle which is greater than 90° and less than 180° is provided between the first control surface and the third control surface or the plane, or the first control surface is configured partially cambered a first surface section of the first control surface and the second surface section of the first control surface is provided, wherein the second surface section of the first control surface is cambered concave, or the first control surface is configured cambered concave in its entirety.

2. The hydraulic valve according to claim 1, wherein an axial thickness of the deflection element in a direction towards the second control surface is configured constant or increasing.

3. The hydraulic valve according to claim 1,
wherein a free distance between a second wall surface of the deflection element arranged opposite to the second control surface and the second control surface varies starting with a largest diameter of the deflection element in a direction towards the third control surface, and wherein the free distance decreases in a direction towards the third control surface.

4. The hydraulic valve according to claim 1, wherein the deflection element is configured as the circumferential protrusion that is adjacent to the control groove.

5. The hydraulic valve according to claim 1,
wherein the displacement device includes a magnet armature and a spring element,
wherein the spring element is arranged at a first end of the valve piston that is configured adjacent to the first flow through opening, and
wherein the magnet armature is arranged at a second end of the valve piston arranged adjacent to the third flow through opening.

6. The hydraulic valve according to claim 1,
wherein a seal element is arranged in the valve housing,
wherein the seal element is penetrated by the first end of the valve piston, and
wherein the first end of the first end of the valve piston is configured as a piston plunger.

* * * * *